US009769986B2

(12) United States Patent
Rotole

(10) Patent No.: US 9,769,986 B2
(45) Date of Patent: Sep. 26, 2017

(54) AGRICULTURAL VEHICLE WITH AUTOMATED REPOSITIONING SYSTEM

(71) Applicant: Deere & Company, Moline, IL (US)

(72) Inventor: David V. Rotole, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/667,793

(22) Filed: Mar. 25, 2015

(65) Prior Publication Data

US 2016/0278284 A1  Sep. 29, 2016

(51) Int. Cl.
| A01D 41/16 | (2006.01) |
| A01D 75/20 | (2006.01) |
| A01D 75/18 | (2006.01) |
| A01D 41/14 | (2006.01) |

(52) U.S. Cl.
CPC ......... *A01D 75/185* (2013.01); *A01D 41/141* (2013.01)

(58) Field of Classification Search
CPC .... A01D 34/00; A01D 34/001; A01D 34/008; A01D 34/283; A01D 41/141; A01D 75/185
USPC ....... 56/10.2 R, 10.2 A, 16.4 A, 16.4 C, 153, 56/192; 701/50
See application file for complete search history.

(56) References Cited

U.S. PATENT DOCUMENTS

| 3,928,955 | A | 12/1975 | Case |
| 4,022,005 | A | 5/1977 | Case |
| 4,211,057 | A * | 7/1980 | Dougherty ........... A01D 41/141 56/10.2 E |
| 4,594,840 | A * | 6/1986 | D'Almeida .......... A01D 41/145 56/11.2 |
| 5,713,190 | A * | 2/1998 | Vermeulen ........... A01D 41/141 56/10.2 E |
| 6,026,634 | A * | 2/2000 | Peter ...................... A01D 34/64 180/6.5 |
| 6,145,289 | A | 11/2000 | Welsch et al. |
| 6,415,590 | B1 * | 7/2002 | Lohrentz ................ A01D 57/20 56/14.9 |
| 6,644,001 | B2 * | 11/2003 | Krone .................. A01B 63/106 172/311 |
| 6,862,873 | B2 | 3/2005 | Franet |
| 7,028,459 | B2 * | 4/2006 | Lohrentz ................ A01D 57/20 56/192 |
| 7,647,753 | B2 | 1/2010 | Schlipf |
| 7,869,922 | B2 * | 1/2011 | Otto ..................... A01D 41/141 56/10.2 E |

(Continued)

FOREIGN PATENT DOCUMENTS

EP  1258184 A1  11/2002

*Primary Examiner* — John G Weiss

(57) ABSTRACT

In accordance with an example embodiment, an agricultural vehicle may include first and second harvesting devices connected to the agricultural vehicle. The agricultural vehicle may include a sensor which detects whether the agricultural vehicle is traveling in an operational or non-operational direction. The agricultural vehicle may include a lift controller in communication with the sensor and the first and second harvesting devices. The lift controller may automatically reposition the first and second harvesting devices into non-operating positions when the lift controller determines an intention to move the agricultural vehicle in a non-operational direction.

19 Claims, 11 Drawing Sheets

(56) References Cited

U.S. PATENT DOCUMENTS

| | | | |
|---|---|---|---|
| 8,109,068 B2* | 2/2012 | Eick | A01D 61/002 |
| | | | 56/10.2 E |
| 9,043,955 B2* | 6/2015 | Nafziger | A01D 47/00 |
| 2003/0226340 A1* | 12/2003 | Havermans | A01D 43/00 |
| | | | 56/10.2 R |
| 2005/0091953 A1* | 5/2005 | Turner | A01D 34/006 |
| | | | 56/10.2 R |
| 2011/0160968 A1* | 6/2011 | Van Bergeijk | A01B 79/005 |
| | | | 701/50 |
| 2014/0144116 A1 | 5/2014 | Kraus | |

* cited by examiner

AGRICULTURAL VEHICLE WITH AUTOMATED REPOSITIONING SYSTEM

CROSS-REFERENCE TO RELATED APPLICATIONS

N/A

FIELD OF THE DISCLOSURE

The present disclosure relates generally to agricultural equipment, and more particularly, to agricultural harvesting equipment.

BACKGROUND

Agricultural harvesting equipment commonly harvest crops in a forward direction with at least a portion of the equipment engaging the crop. When the equipment is moved in the opposite or reverse direction, the portion of the equipment engaging the crop may need to be raised to a disengaged position to prevent damage to the equipment. Equipment operators must manually raise the portion of the equipment engaging the crop prior to moving the equipment in the reverse direction.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, an agricultural vehicle may include first and second harvesting devices connected to the agricultural vehicle. The agricultural vehicle may include a sensor which detects whether the agricultural vehicle is traveling in an operational or non-operational direction. The agricultural vehicle may include a lift controller in communication with the sensor and the first and second harvesting devices. The lift controller may automatically reposition the first and second harvesting devices into non-operating positions when the lift controller determines an intention to move the agricultural vehicle in a non-operational direction.

According to an aspect of the present disclosure, a method of repositioning a harvesting device connected to an agricultural vehicle may include monitoring one or more sensors to determine the direction of travel of the agricultural vehicle; selecting one or more harvesting devices for control; determining whether there is an intent to move the agricultural vehicle in a non-operational direction; determining the position of first and second harvesting devices; and automatically repositioning the first and second harvesting devices to non-operating positions based at least in part upon the intent to move the agricultural vehicle in a non-operational direction.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
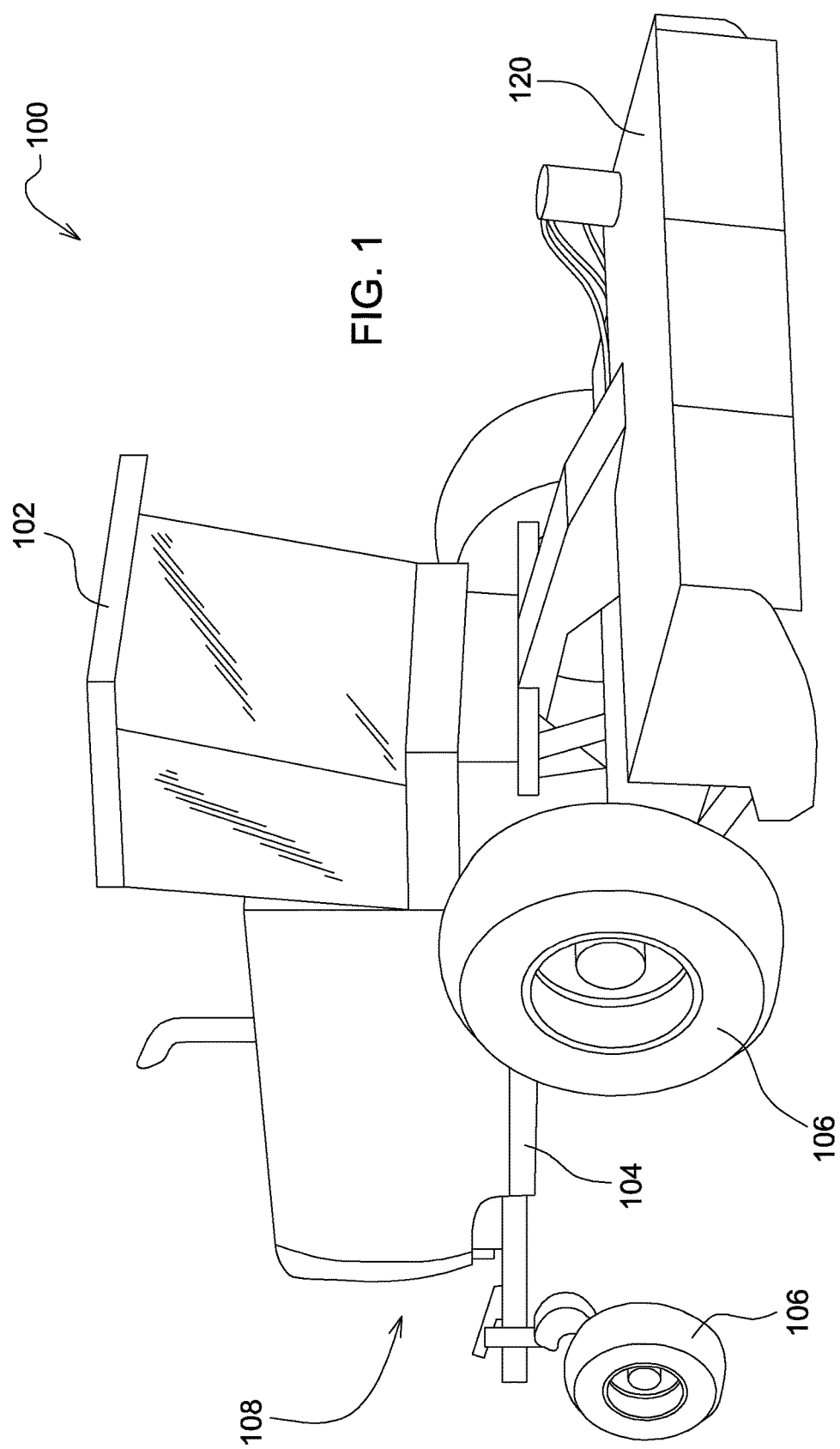
FIG. 1 is a perspective view of a vehicle, according to one embodiment.

FIG. 1 illustrates an agricultural vehicle 100 used in the agricultural industry, for example, which may include an automated repositioning system having any one or more of the controllers, sensors, and devices described herein. Although a self-propelled windrower is shown in FIG. 1, the present disclosure is not limited to just self-propelled equipment or windrowers, but also applies to other self-propelled and pull-type agricultural harvesting equipment, such as cutters, mowers, mower-conditioners, forage harvesters, and combines. The vehicle 100 may include an operator compartment or cab 102 where an operator may direct or control the operation of the vehicle 100. The vehicle 100 may include a frame 104 to which one or more ground engaging apparatus 106, such as wheels or tracks, are operable connected. The vehicle 100 may include a power source and a transmission operably coupled to one or more ground engaging apparatus 106. The vehicle 100 may include a harvesting device or attachment, such as a harvesting header 120, which harvests a variety of crops including, but not limited to, hay, corn, and soybeans. The harvesting header 120 can be a rotary header or a draper header. The vehicle 100 may include a single harvesting header 120 or multiple harvesting headers 120. The harvesting header 120 may include a lowered or operating position, as shown, and a raised or non-operating position. The harvesting header 120 may include an active or operating condition and an inactive or non-operating condition. In the operating condition, the components of the harvesting header 120 are moving or otherwise operational.

Figure 2:
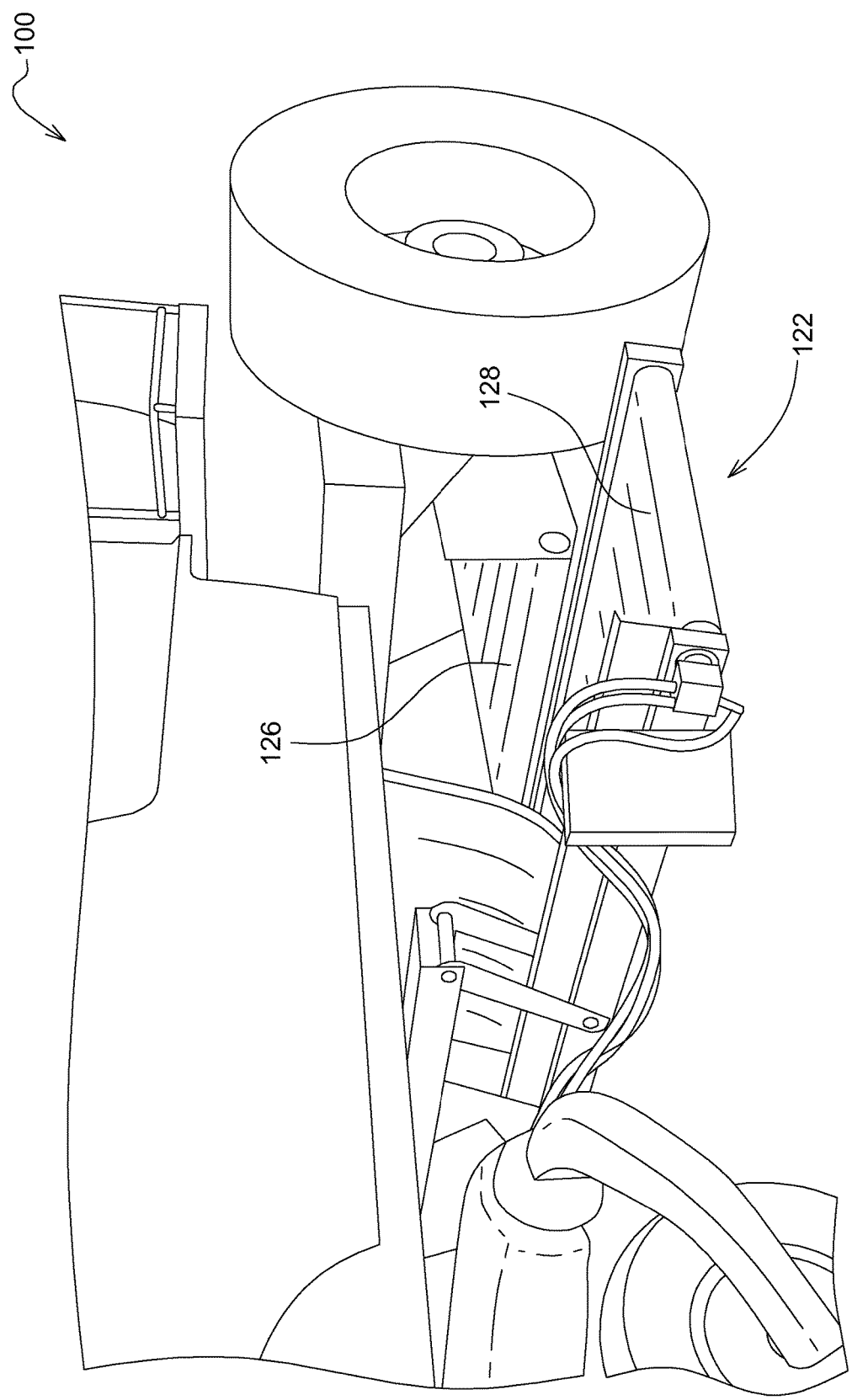
FIG. 2 is a perspective view of a vehicle including a merger device, according to one embodiment.

FIG. 2 illustrates an agricultural vehicle 100 used in the agricultural industry, for example, which may include an automated repositioning system. The vehicle 100 may include another harvesting device or attachment, such as a merger device 122 having one or more conveyors 126, 128. The merger device 122 may include a lowered or other operating position and a raised or other non-operating position. The merger device 122 may include an active or operating condition and an inactive or non-operating condition. In the operating condition, the one or more conveyors 126, 128 are moving or otherwise operational. The merger device 122 may include a conveyor 126 which receives harvested crop from the harvesting header 120, shown in FIG. 1, and delivers the crop to a cross-conveyor 128. The cross-conveyor 128 receives the crop from the conveyor 126 and delivers the crop to either side of the vehicle 100. Additionally or alternatively, the vehicle 100 could include one or more merger devices 122 positioned on or near the rear of the vehicle 100.

Figure 3:
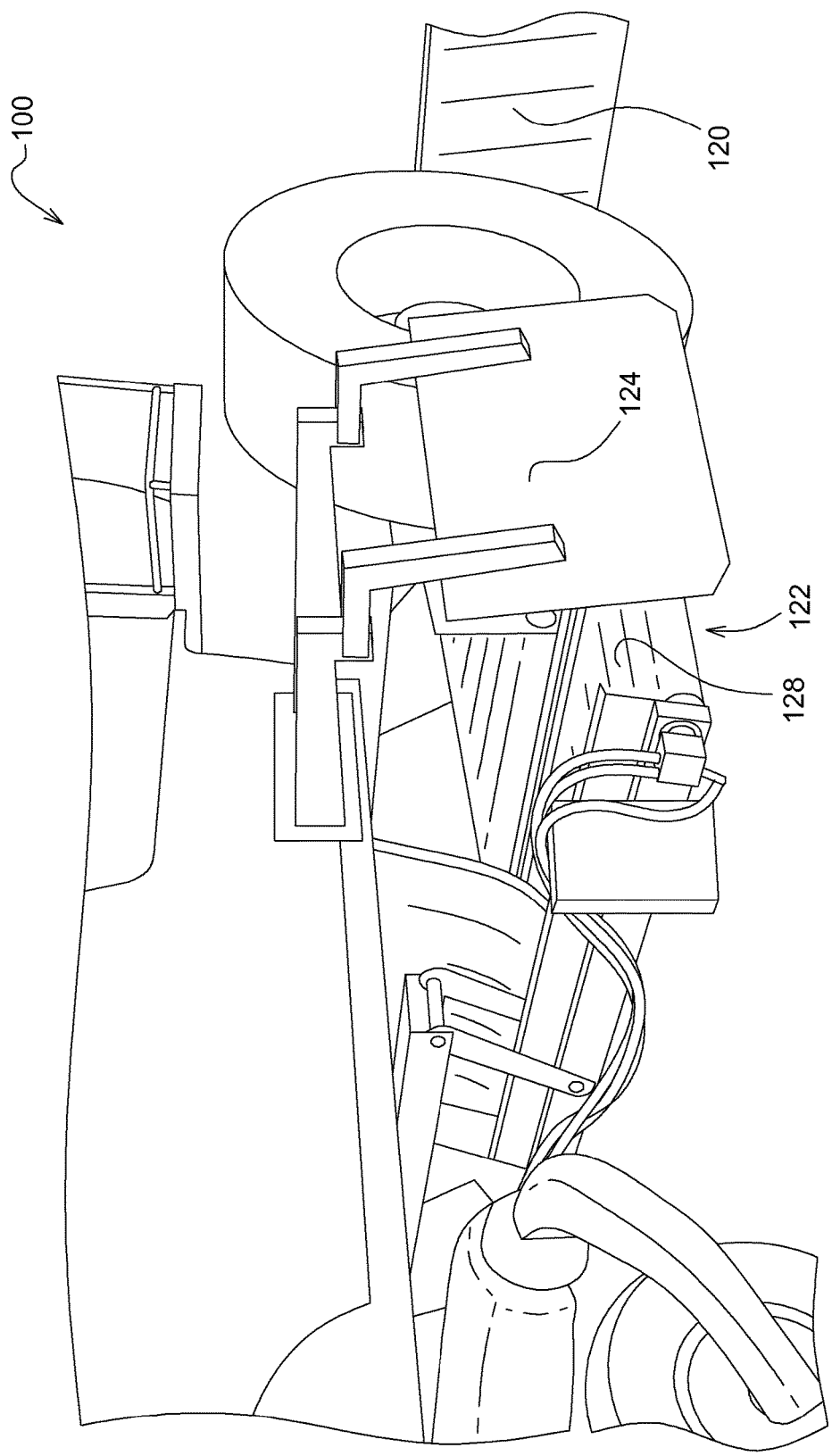
FIG. 3 is a perspective view of a vehicle including a merger device, according to one embodiment.

FIG. 3 illustrates an agricultural vehicle 100 including a harvesting device or attachment, such as a merger device 122. The merger device 122 may include a cross-conveyor 128 which receives the crop from the harvesting header 120, shown in FIG. 1 for example, and delivers the crop to either side of the vehicle 100. The merger device 122 may include a deflector 124 which can direct the crop after it leaves the cross-conveyor 128. The deflector 124 may include a lowered or operating position, as shown, and a raised or non-operating position. In the lowered position, the deflector 124 engages or directs the crop after it leaves the cross-conveyor 128. In the raised position, the deflector 124 remains disengaged from the flow of crop as it leaves the cross-conveyor 128. The vehicle 100 may include another harvesting device or attachment, such as a canola roller or a swath roller, which can be located underneath the vehicle 100 in a similar location as the merger device 122 or behind the vehicle 100. The canola roller or swath roller can be used in conjunction with a draper header 120. Whether the agricultural harvesting vehicle 100 includes a rotary header coupled with a merger device, or a draper header coupled with a canola roller, these devices can harvest crops in series with the appropriate header processing the crop first, and then the merger device or canola roller processing the crop second.

Figure 4:
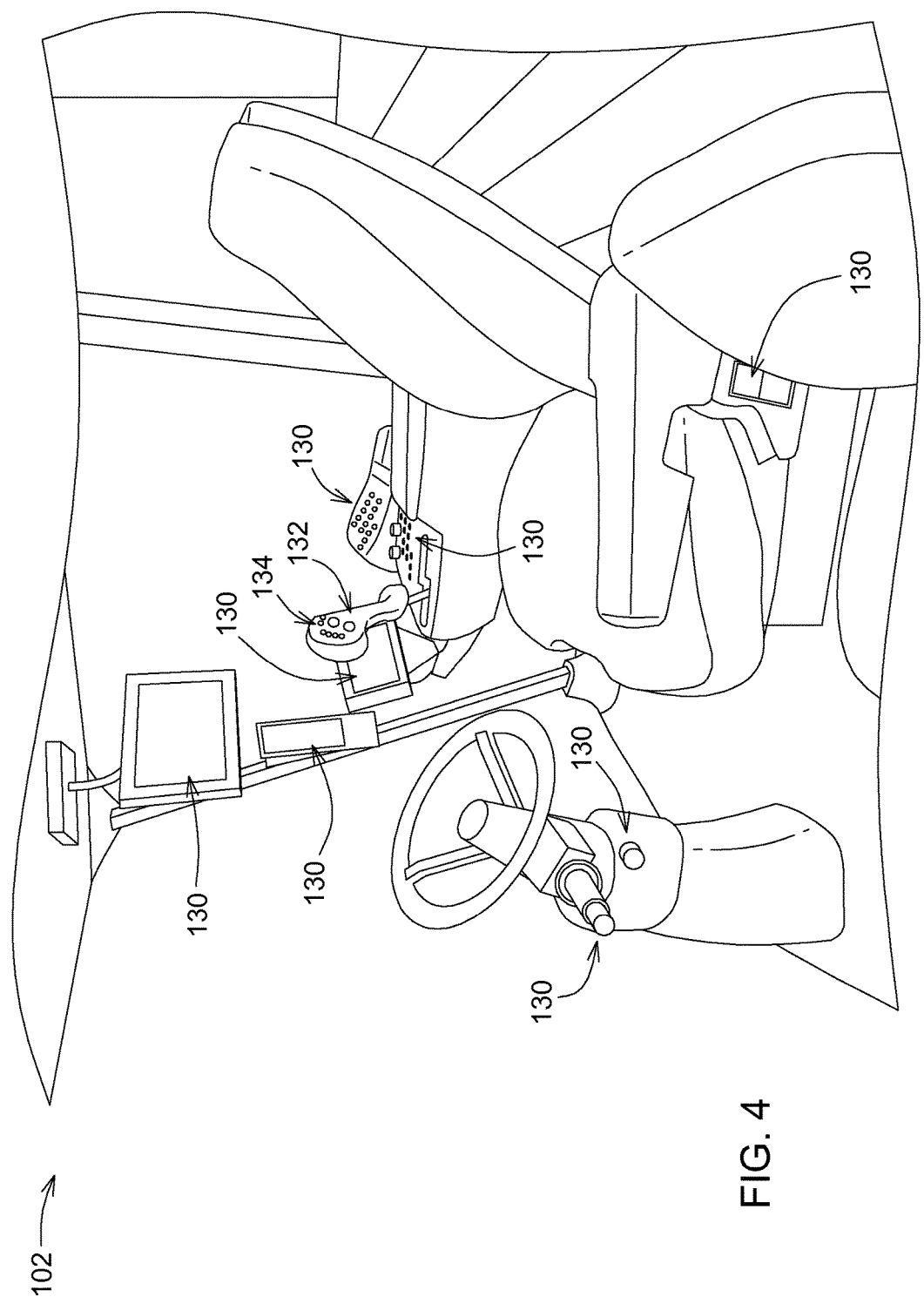
FIG. 4 is a perspective view of an interior portion of an operator compartment, according to one embodiment.

FIG. 4 illustrates an interior of a cab 102 including one or more operator controls 130, such as a direction input device 132 and a device selector 134. The direction input device 132 provides an interface for an operator to control the direction of the vehicle 100, as shown in FIG. 1 for example. The direction input device 132 may shift the vehicle 100 into a forward direction, a reverse direction, or neutral, as shown in FIGS. 7A-7D for example. The forward direction can be the operational direction; the reverse direction can be the non-operational direction; and neutral can be an operational or non-operational direction. The device selector 134 provides an interface for an operator to select or pre-select which devices are to be controlled by an automated repositioning system. The device selector 134 is optional and depending upon the embodiment may or may not be included. The device selector 134 may include the option to select the header 120, the merger 122, the deflector 124, one or more other devices, or any combination of these devices to be controlled by the automated repositioning functionality of a lift control unit 140, shown in FIG. 5 or 5A for example. The device selector 134 may also have the option to select a null or none setting, or an "off" setting, in which none of the devices would be automatically controlled by the lift control unit 140. This selection would deactivate the automated repositioning functionality of the lift control unit 140, thus deactivating the automated repositioning system. Each of the devices could still be manually controlled via the lift control unit 140 or another controller. The device selector 134 may also have the option to select a default or pre-defined setting, which would include a default or pre-defined selection of devices. The device selector 134 may also have the option to select an operator defined setting, in which the operator can define which devices are selected.

Figure 5:
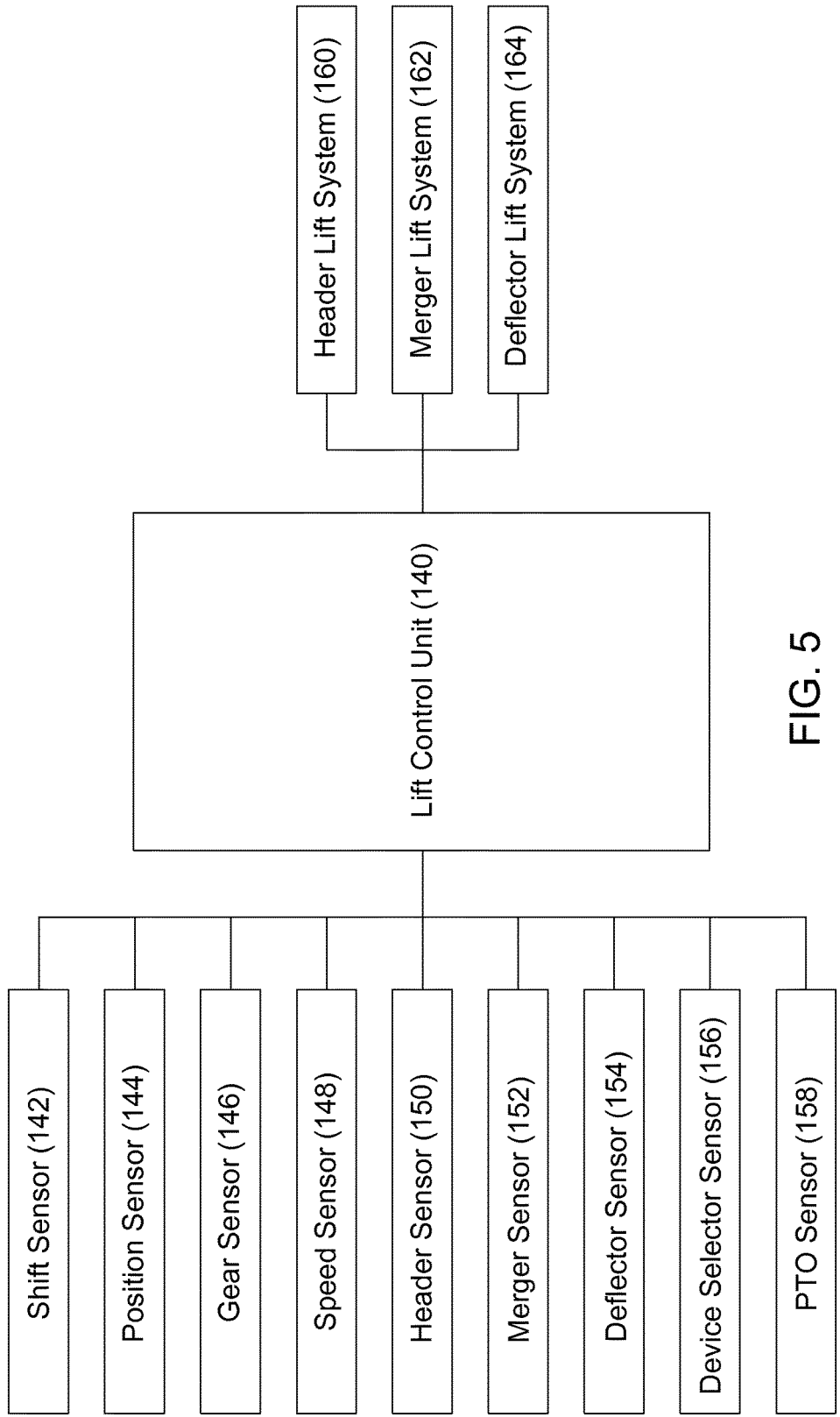
FIG. 5 is a schematic diagram of a lift control unit, or lift controller, according to one embodiment.
Figure 5A:
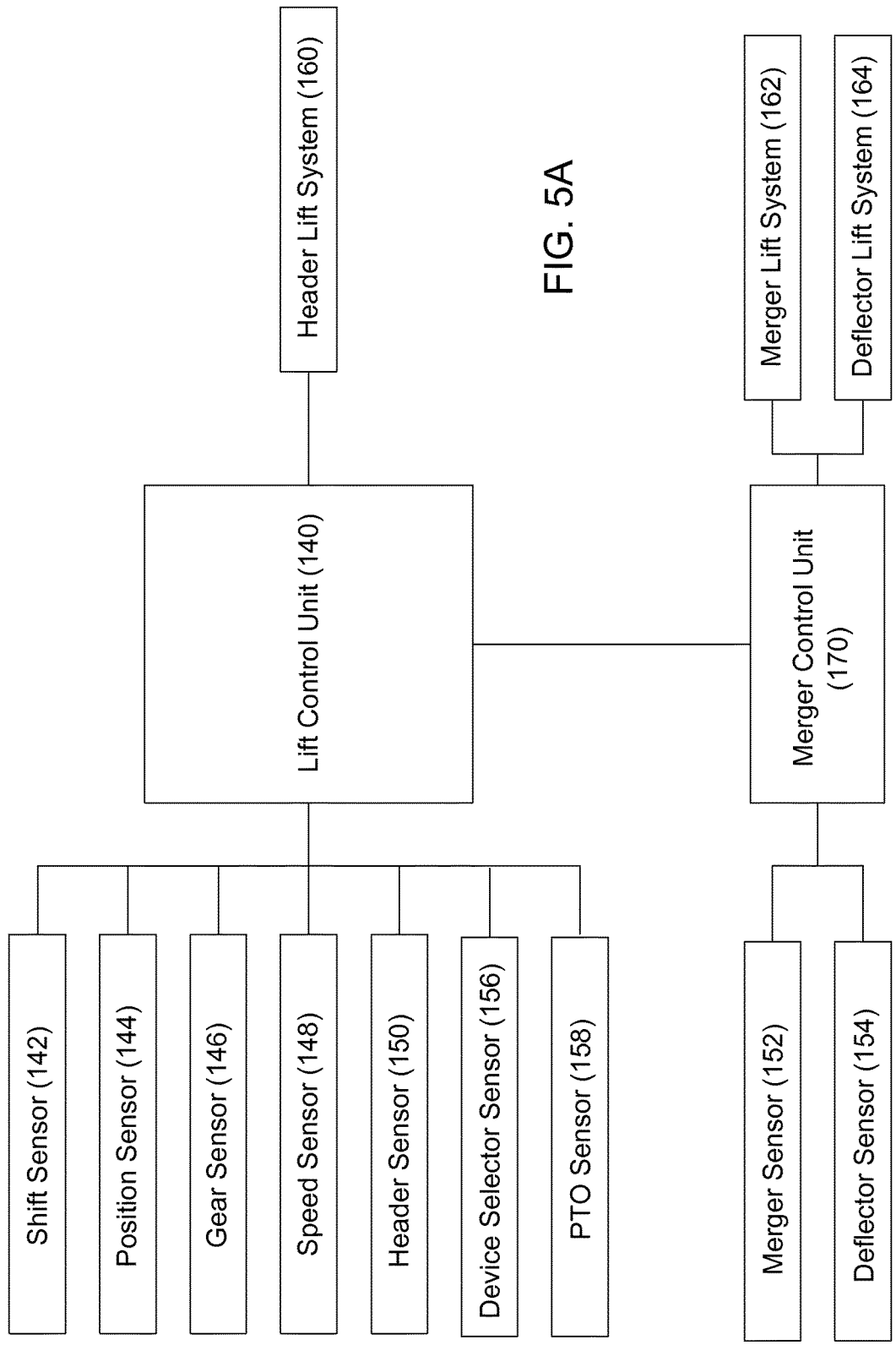
FIG. 5A is a schematic diagram of a lift control unit, or lift controller, according to one embodiment.
Figure 6:
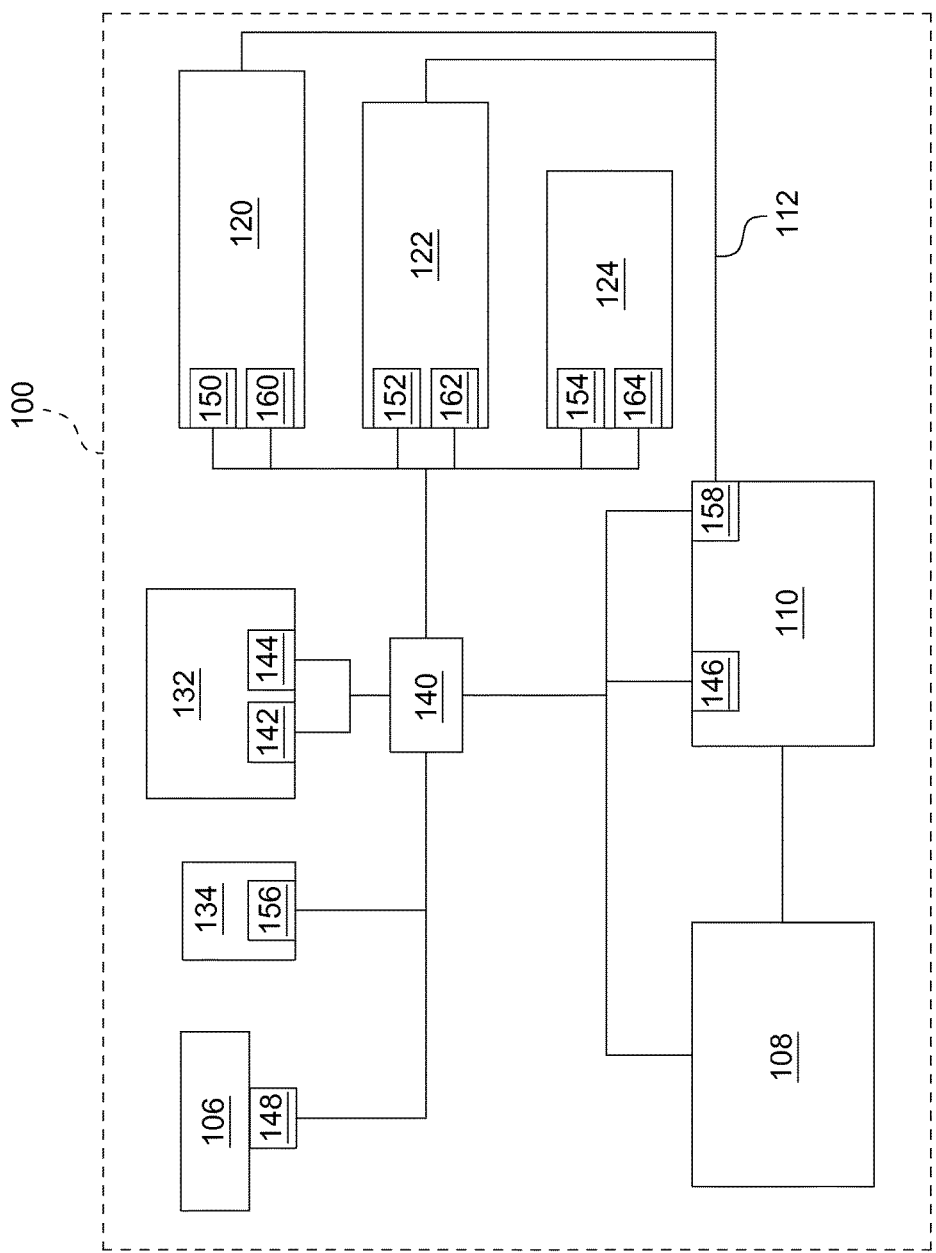
FIG. 6 is a schematic diagram of an implementation of a lift control unit, or lift controller, in a vehicle, according to one embodiment.
Figure 6A:
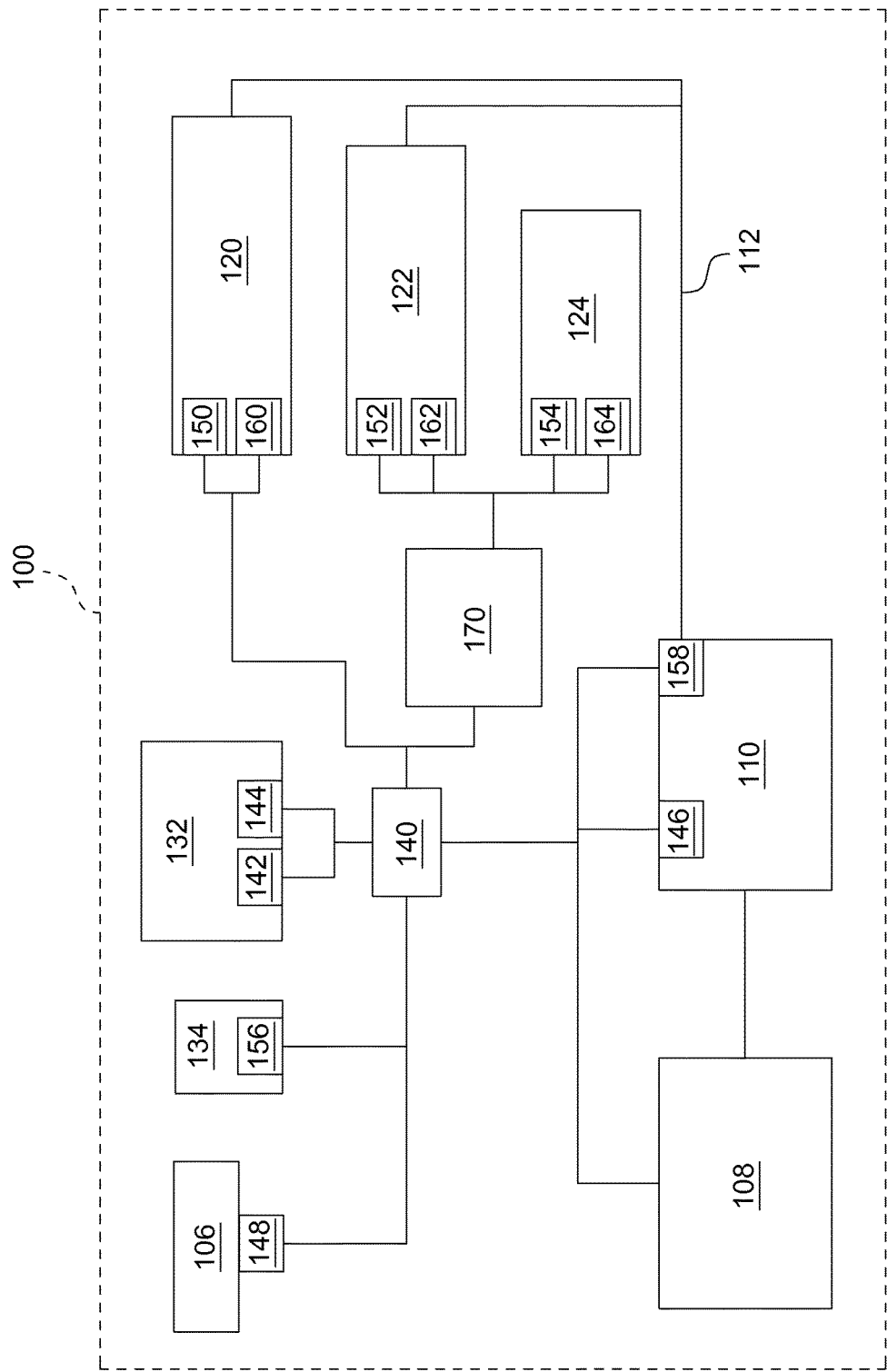
FIG. 6A is a schematic diagram of an implementation of a lift control unit, or lift controller, in a vehicle, according to one embodiment.

FIG. 5 illustrates a schematic diagram of a lift control unit, or lift controller, 140, according to one embodiment. FIG. 5A illustrates a schematic diagram of a lift control unit, or lift controller, 140, and a merger control unit, or merger controller, 170, according to another embodiment. FIG. 6 illustrates a schematic diagram of an implementation of a lift controller 140 in a work machine 100, according to one embodiment. FIG. 6A illustrates a schematic diagram of an implementation of a lift controller 140 and a merger controller 170 in a work machine 100, according to another embodiment. The following description may refer to the embodiment in one or more of the following figures: FIG. 5, FIG. 5A, FIG. 6, and FIG. 6A. The vehicle 100 may include a power source 108 operably coupled to a transmission 110. The power source 108 may include an internal combustion engine, an electric motor, or a combination. The vehicle 100 may include a direction input device 132 coupled to the transmission 110 either mechanically, hydraulically, or electrically, for example. The vehicle 100 may include a power-take-off or PTO shaft 112 operably coupled to the transmission 110, or a gearbox coupled to the power source 108 or transmission 110, and operably coupled to the harvesting header 120, the merger device 122, or both. The PTO shaft 112 may provide the power required to operate the harvesting header 120, the merger device 122, or both.

The lift control unit, or lift controller, 140 may include one or more microprocessor-based electronic control units or controllers. The lift controller 140 may include one self-contained unit or two or more separate units. The lift controller 140 can be a programmable logic controller, also known as a PLC or programmable controller. The lift controller 140 may connect to a vehicle or agricultural harvesting equipment electronic control system through a data bus, such as a CAN bus, or the lift controller 140 could be a part of the vehicle or equipment electronic control system. The lift controller 140 may be in communication with one or more sensors including, but not limited to: a shift sensor 142, a direction sensor 144, a transmission sensor 146, a speed sensor 148, a header position sensor 150, a merger position sensor 152, a deflector position sensor 154, a selector sensor 156, a power-take-off or PTO sensor 158, and other sensors. Each of the foregoing sensors may be separate or integrated with each corresponding device. Alternatively, the lift controller 140 may be in communication with each of the devices instead of or in addition to the sensors. The lift controller 140 may also be in communication with one or more devices or systems including, but not limited to, a header lift system 160, a merger lift system 162, a deflector lift system 164, and other lift systems including, but not limited to, a canola or swath roller lift system. The lift controller 140 may include an automated or automatic mode and a manual mode. In the automated or automatic mode, the automated repositioning functionality of the lift controller 140 is activated and can automatically reposition one or more of the devices. In manual mode, the automated repositioning functionality of the lift controller 140 is deactivated and the lift controller 140 may manually reposition one or more of the devices based upon operator input and control.

The merger control unit, or merger controller, 170 may include one or more microprocessor-based electronic control units or controllers. The merger controller 170 may include one self-contained unit or two or more separate units. The merger controller 170 may be a part of the lift controller 140. The merger controller 170 can be a programmable logic controller, also known as a PLC or programmable controller. The merger controller 170 may connect to a vehicle or agricultural harvesting equipment electronic control system through a data bus, such as a CAN bus, or the merger controller 170 could be a part of the vehicle or equipment electronic control system. The merger controller 170 may be in communication with one or more sensors including, but not limited to: a merger position sensor 152, a deflector position sensor 154, and other sensors. Each of the foregoing sensors may be separate or integrated with each corresponding device. Alternatively, the merger controller 170 may be in communication with each of the devices instead of or in addition to the sensors. The merger controller 170 may also be in communication with one or more devices or systems including, but not limited to, a merger lift system 162, a deflector lift system 164, and other lift systems. The merger controller 170 may include an automated or automatic mode and a manual mode.

The shift sensor 142 may be positioned on or near the direction input device 132 or on or near any of the shifting or transmission components. The shift sensor 142 may detect when the direction input device 132 is receiving an operator input. An operator may apply a force or input to the direction input device 132 in order to initiate a change in direction of travel of the vehicle 100. The shift sensor 142 may sense or detect the magnitude of the operator input received by the direction input device 132, the direction of the operator input received by the direction input device 132, or both. The shift sensor 142 may detect when the operator input is removed from the direction input device 132. The shift sensor 142 may detect when the change in direction of travel is complete, or when the direction input device 132 is in the desired position.

The shift sensor 142 may detect whether the operator input is a shifting input or a non-shifting input. A shifting input, for example, includes an operator input applied in a manner and direction that would generate a change in speed or direction of travel. A non-shifting input, for example, includes an operator input applied in a manner or direction that would not generate a change in speed or direction. The shift sensor 142 can be any type of sensor capable of detecting operator input including, but not limited to, inductive sensors, strain gauges, or contact sensors.

The direction sensor 144 may be positioned on or near the direction input device 132 or the coupling between the direction sensor 144 and the transmission 110. The direction sensor 144 may detect the position of the direction input device 132 including in which direction, such as forward, neutral, or reverse, the direction input device 132 is positioned. The direction sensor 144 may include one or more ball switches.

The transmission sensor 146 may be positioned on or in the transmission 110 and detect whether the transmission 110 is in a forward, neutral, or reverse condition. The transmission sensor 146 may detect the current condition by comparing the speeds of the relative transmission shafts. The transmission sensor 146 may include one or more speed or rotation sensors to measure the speeds of the transmission shafts.

The speed sensor 148 may be positioned near an output of the transmission 110 or an axle or wheel to detect whether the vehicle 100 is moving and the speed and direction of travel, such as forward or reverse. The speed sensor 148 may detect the speed and direction of an output of the transmission 110 or an axle or wheel 106 and then determine or calculate the speed and direction of the vehicle 100.

The header sensor 150 may be positioned on or near the harvesting header 120. The header sensor 150 may detect the position, the operating condition, or both of the header 120. The header sensor 150 may be a position sensor which detects the position of the header 120, a pressure sensor which detects the fluid pressure associated with the header 120, or an electrical sensor which detects the electrical condition of the header 120.

The merger sensor 152 may be positioned on or near the merger device 122. The merger sensor 152 may detect the position, the operating condition, or both of the merger 122. The merger sensor 152 may be a position sensor which detects the position of the merger 122, a pressure sensor which detects the fluid pressure associated with the merger 122, or an electrical sensor which detects the electrical condition of the merger 122.

The deflector sensor 154 may be positioned on or near the deflector 124. The deflector sensor 154 may detect the position, the operating condition, or both of the deflector 124. The deflector sensor 154 may be a position sensor which detects the position of the deflector 124, a pressure sensor which detects the fluid pressure associated with the deflector 124, or an electrical sensor which detects the electrical condition of the deflector 124.

The selector sensor 156 may be positioned on or near the device selector 134. The selector sensor 156 may detect the selection of the device selector 134, for example, which devices have been selected to be automatically controlled by the lift controller 140. The selector sensor 156 may be any type of sensor that can detect and communicate the selection of the device selector 134 to the lift controller 140.

The power-take-off or PTO sensor 158 may be positioned on or near the PTO shaft 112. The PTO sensor 158 may detect whether the PTO shaft 112 is in an operational condition, for example rotating, or in a non-operational condition, for example not rotating. Additionally or alternatively, the PTO sensor 158 may detect the rotational speed of the PTO shaft 112. The PTO sensor 158 may be any type of sensor that can detect and communicate whether the PTO shaft 112 is rotating, the rotational speed of the PTO shaft 112, or both, to the lift controller 140.

The device selector 134 may select which devices are to be automatically controlled by the lift controller 140. For example, the device selector 134 may include the option to select the header 120, the merger 122, the deflector 124, one or more other devices, or any combination of these devices. The lift controller 140 would then automatically control or reposition the selected devices. Alternatively, the deflector 124 could be a part of the merger 122 such that the lift controller 140 would indirectly control or reposition the deflector 124 via control of the merger 122. The device selector 134 may include an option to not select any devices to be automatically controlled by the lift controller 140. This selection would deactivate the automated repositioning functionality of the lift controller 140, and as a result, deactivate the automated repositioning system. The device selector 134 may also include an "off" or disable setting, which would also deactivate the automated repositioning functionality of the lift controller 140. Additionally or alternatively, the automated repositioning system could be activated and deactivated by other controls. Each of the devices could still be repositioned under manual control by the equipment operator.

The header lift system 160 may utilize any mechanical, hydraulic, pneumatic, or electrical system, or combination of systems, to raise and lower the harvesting header or headers 120. The merger lift system 162 may utilize any mechanical, hydraulic, pneumatic, or electrical system, or combination of systems, to raise and lower the merger device or devices 122. The deflector lift system 164 may utilize any mechanical, hydraulic, pneumatic, or electrical system, or combination of systems, to raise and lower the deflector or deflectors 124. One or more other lift systems could be utilized to raise and lower, or otherwise control, one or more other devices associated with or connected to the vehicle 100.

The lift controller 140 may be in electrical communication with one or more of the sensors, devices, or other controllers. The lift controller 140 may determine an intention to move the vehicle 100 in a reverse, forward, neutral, operational, non-operational, or other direction based upon the communication or signals received from one or more of the sensors, devices, or other controllers. The lift controller 140 may use the communication or signals received from one or more of the sensors to determine whether to activate the header lift system 160, the merger lift system 162, the deflector lift system 164, other lift systems, or any combination of these systems. The lift controller 140 may determine whether to raise or lower, or otherwise reposition or control, one or more of the harvesting header 120, the merger device 122, the canola or swath roller, the deflector 124, or one or more other devices based upon the input received from one or more sensors, devices, or other controllers. For example, the lift controller 140 may determine to automatically reposition the harvesting header 120 and the merger device 122 into non-operating positions based upon the input received from one or more sensors which detect the intent to move the vehicle 100 in a non-operational direction. In another example, the lift controller 140 may determine to automatically reposition the harvesting header 120 and the merger device 122 into non-operating positions based upon the input received from one or more sensors which detect the intent to move the vehicle 100 in a non-operational direction and detect that the harvesting header 120, the merger device 122, or both, are in an operating condition.

The merger controller 170 may be in electrical communication with one or more of the sensors, devices, and other controllers including the lift controller 140. The merger controller 170 may use the communication or signals received from one or more of the sensors, devices, and other controllers to determine whether to activate the merger lift system 162, the deflector lift system 164, other lift systems, or any combination of these systems. The merger controller 170 may determine whether to raise or lower, or otherwise reposition or control, one or more of the merger device 122, the deflector 124, or one or more other devices based upon the input received from one or more sensors, devices, and other controllers. For example, the merger controller 170 may determine to automatically reposition the merger device 122, the deflector 124, or both into non-operating positions based upon the input received from one or more sensors, devices, and other controllers which detect or determine the intent to move the vehicle 100 in a non-operational direction.

The lift controller 140 may direct the lift systems to simultaneously reposition the corresponding devices; to commence repositioning a first device while delaying the repositioning of a second device until the first device reaches a specific position; to commence repositioning a first device while delaying the repositioning of a second device until a specific amount of time has elapsed; or to completely reposition a first device before starting to reposition a second device. The lift controller 140 may direct the corresponding lift systems to perform any one of these scenarios or others.

The lift controller 140 may determine to raise the harvesting header 120, the merger device 122, the deflector 124, one or more other devices, or any combination of these devices when one or more of the sensors indicate the intention to move the vehicle 100 in a reverse or other non-operational direction, in a direction opposite to the harvesting or operational direction, or in a direction different from the harvesting or operational direction. For example, the lift controller 140 may determine to automatically raise the harvesting header 120 and merger device 122 when one or more of the sensors indicate the intent to move the vehicle 100 in a reverse direction. The shift sensor 142, the direction sensor 144, the transmission sensor, the speed sensor 148, other sensors, or any combination of these sensors are capable of indicating an intent to move the vehicle 100 in a reverse or other non-operational direction. Additionally or alternatively, the lift controller 140 may determine to deactivate the harvesting header 120, the merger device 122, one or more other devices, or any combination of these devices.

The lift controller 140 may determine to raise one or more devices when one or more of the sensors indicate the intention to move the vehicle 100 in a reverse or other non-operational direction and when one or more of the sensors indicate the harvesting header 120, the merger device 122, or both are in an operating condition. For example, the lift controller 140 may determine to automatically raise the harvesting header 120 and merger device 122 when one or more of the sensors indicate the intent to move the vehicle 100 in a reverse direction and one or more of the sensors indicate that the harvesting header 120, the merger device 122, or both are in an operating condition. The header sensor 150, the merger sensor 152, the PTO sensor 158, other sensors, or any combination of these sensors are capable of indicating whether the harvesting header 120, the merger device 122, or both are in an operating condition. The lift controller 140 could determine that the one or more devices are in their respective raised or non-operating positions based upon the amount of time the one or more devices were being raised or repositioned; or the lift controller 140 could determine that the one or more devices are in their respective raised or non-operating positions based upon the positions of the one or more devices, or both, using position sensors, for example.

The lift controller 140 may determine to return the harvesting header 120, the merger device 122, the deflector 124, one or more other devices, or any combination of these devices to their respective operating positions, or respective prior positions, when one or more of the sensors indicate the intention to move the vehicle 100 in a forward or other operational direction or when one or more of the sensors indicate the intention to change the direction of the vehicle 100. For example, the lift controller 140 may determine to automatically lower or otherwise reposition the harvesting header 120 and the merger device 122 when one or more of the sensors indicate the intent to move the vehicle 100 in a forward direction. Additionally or alternatively, the lift controller 140 may determine to return the harvesting header 120, the merger device 122, the deflector 124, one or more other devices, or any combination of these devices to their respective operating conditions. The lift controller 140 could determine that the one or more devices are in their respective lowered or operating positions based upon the amount of time the one or more devices were being lowered or repositioned; or the lift controller 140 could determine that the one or more devices are in their respective lowered or operating positions based upon the positions of the one or more devices, or both, using position sensors, for example.

When the lift controller 140 determines that one or more of the harvesting header 120, the merger device 122, the deflector 124, or other devices should be raised or lowered, or otherwise repositioned, the lift controller 140 sends communication to the one or more corresponding systems: the header lift system 160, the merger lift system 162, the deflector lift system 164, and other lift systems. For example, when the lift controller 140 determines the harvesting header 120 and the merger device 122 should be raised, the lift controller 140 sends communication to the header lift system 160 to raise the header 120 and to the merger lift system 162 to raise the merger 122. The lift controller 140 may direct the header lift system 160 and the merger lift system 162 to simultaneously raise the header 120 and the merger 122; to begin raising the header 120 before the merger 122, or vice versa; or to completely raise the header 120 before starting to raise the merger 122, or vice versa. The lift controller 140 may direct the header lift system 160 to start raising the header 120 for a specific amount of time before starting to raise the merger 122, or vice versa. The lift controller 140 may direct the header lift system 160 to start raising the header 120 until the header 120 reaches a certain position before starting to raise the merger 122, or vice versa. Although the preceding examples were described with two devices, the same concepts apply for three or more devices.

The lift controller 140 may reposition the harvesting header 120, the merger device 122, the deflector 124, one or more other devices, or any combination of these devices when the shift sensor 142 detects an operator input to the direction input device 132. The lift controller 140 may reposition one or more of these devices when the direction sensor 144 detects the direction input device 132 being moved into or out of the forward position, being moved into or out of the neutral position, or being moved into or out of the reverse position, as shown for example in FIGS. 7A-7D. The lift controller 140 may reposition one or more of these devices when the transmission sensor 146 detects the transmission 110 is in forward, neutral, or reverse or transitioning between any of these gears. The lift controller 140 may reposition one or more of these devices when the speed sensor 148 detects the vehicle has stopped or started moving or has changed directions. The lift controller 140 may reposition one or more of these devices when the speed sensor 148 detects the vehicle 100 has stopped or started moving or has changed directions. For example, the lift controller 140 may raise the header 120 and the merger 122 when the shift sensor 142 or direction sensor 144, or both, detect the direction input device 132 is being moved from the forward to the neutral position, from the forward to the reverse position, or from the neutral to the reverse position.

Additionally or alternatively, the lift controller 140 may change the operating condition of the harvesting header 120, the merger device 122, one or more other devices, or any combination of these devices when the shift sensor 142 detects an operator input to the direction input device 132. The lift controller 140 may change the operating condition of one or more of these devices when the direction sensor 144 detects the direction input device 132 being moved into or out of the forward position, being moved into or out of the neutral position, or being moved into or out of the reverse position. The lift controller 140 may change the operating condition of one or more of these devices when the transmission sensor 146 detects the transmission 110 is in forward, neutral, or reverse or transitioning between any of these gears. The lift controller 140 may change the operating condition of one or more of these devices when the speed sensor 148 detects the vehicle has stopped or started moving or has changed directions. The lift controller 140 may change the operating condition of one or more of these devices when the speed sensor 148 detects the vehicle 100 has stopped or started moving or has changed directions. For example, the lift controller 140 may change the operating condition of the header 120 and the merger 122 when the shift sensor 142 or direction sensor 144, or both, detect the direction input device 132 is being moved from the forward to the neutral position, from the forward to the reverse position, or from the neutral to the reverse position.

Figure 7D:
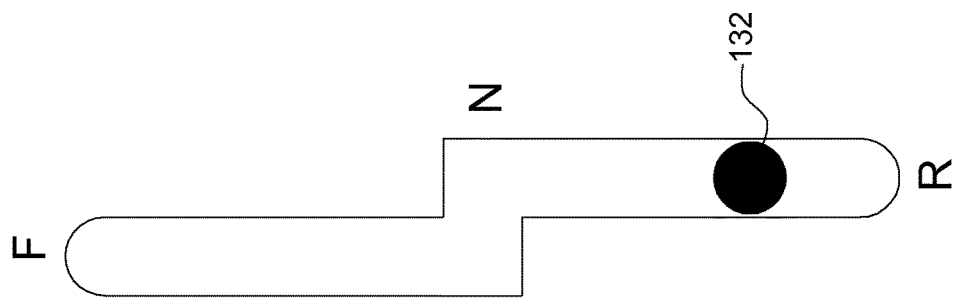
FIG. 7D is a diagram of a shift pattern for a direction input device, according to one embodiment.
Figure 7C:
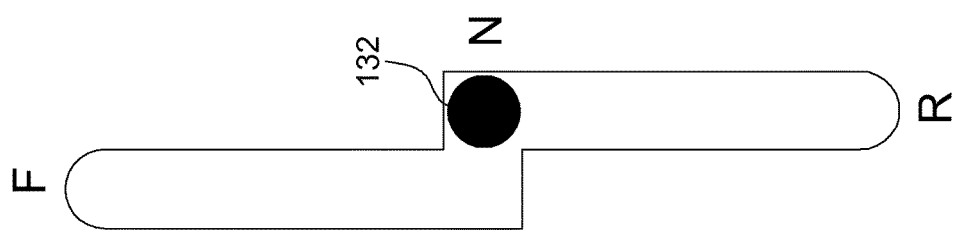
FIG. 7C is a diagram of a shift pattern for a direction input device, according to one embodiment.
Figure 7B:
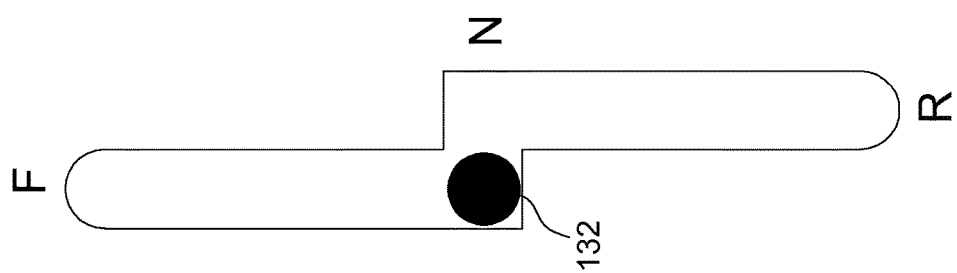
FIG. 7B is a diagram of a shift pattern for a direction input device, according to one embodiment.
Figure 7A:
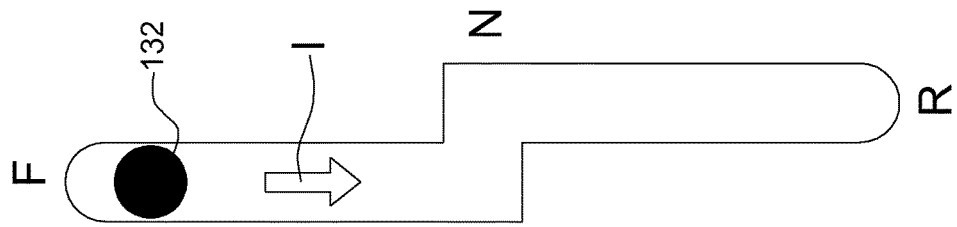
FIG. 7A is a diagram of a shift pattern for a direction input device, according to one embodiment.

FIG. 7A illustrates a direction input device 132 in a forward position or mode. An operator input I to the direction input device 132 can change the position or mode. FIG. 7B illustrates a direction input device 132 in a neutral position or mode. FIG. 7B illustrates a direction input device 132 in another neutral position or mode. FIG. 7D illustrates a direction input device 132 in a reverse position or mode.

Figure 8:
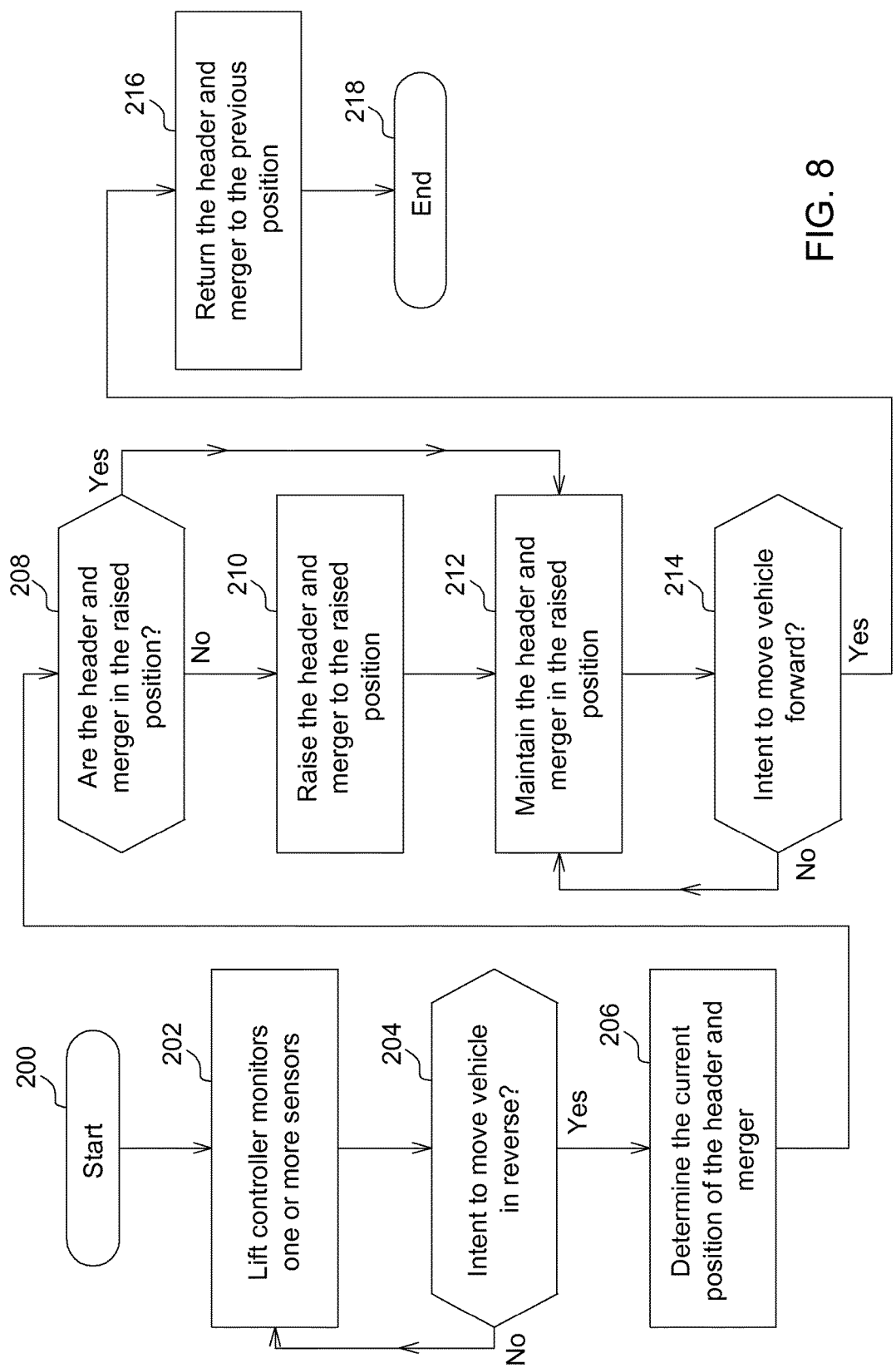
FIG. 8 is a flow diagram illustrating a method of repositioning apparatus connected to a vehicle, according to one embodiment.

FIG. 8 illustrates a flow chart of a method of repositioning apparatus connected to a vehicle, according to one embodiment, which may be implemented in the embodiment depicted in one or more of the following figures: FIG. 5, FIG. 5A, FIG. 6, and FIG. 6A. At step 200, the automated repositioning system is activated and the method starts.

At step 202, the lift controller 140 monitors one or more sensors, devices, or both. The vehicle could be stationary or moving in any direction. The direction input device 132 could be in positioned in a forward mode, as shown in FIG. 7A, and the vehicle 100 would be traveling at a corresponding forward speed. The direction input device 132 could be positioned in a neutral mode, as shown in FIG. 7B or 7C.

A step 204, the lift controller 140 determines an intent to move the vehicle 100 in a reverse or other non-operational direction. As discussed above, the lift controller 140 could make this determination using a variety of sensors, devices, or both. For example, the direction input device 132 could move from the forward position in FIG. 7A to the neutral position in FIG. 7B, or from the neutral position in FIG. 7B to the neutral position in FIG. 7C, or from the neutral position in FIG. 7C to the reverse position in FIG. 7D.

At step 206, when the lift controller 140 determines the intent to move the vehicle 100 in a reverse or other non-operational direction, then the lift controller 140 determines the position of the header 120, the merger 122, or both.

Additionally or alternatively, the lift controller 140 can determine the operating condition of the header 120, the merger 122, or both.

At step 208, the lift controller 140 determines whether to raise or reposition the header 120, the merger 122, or both based at least in part on the position of the header 120, the merger 122, or both. Additionally or alternatively, the lift controller 140 can determine to change the operating condition of the header 120, the merger 122, or both, for example, to deactivate the header 120 and merger 122.

At step 210, if the header 120, the merger 122, or both are in a lowered or other operating position, then the lift controller 140 repositions the header 120, the merger 122, or both into raised or other non-operating positions. Additionally or alternatively, if the header 120, the merger 122, or both are in an operating condition, then the lift controller 140 deactivates the header 120, the merger 122, or both into non-operating conditions.

At step 212, if the header 120, the merger 122, or both are in a raised or other non-operating position, then the lift controller 140 maintains the header 120, the merger 122, or both in the raised or other non-operating position. Additionally or alternatively, if the header 120, the merger 122, or both are in a non-operating condition, then the lift controller 140 maintains the header 120, the merger 122, or both in the non-operating conditions.

At step 214, the lift controller 140 determines the intent to move the vehicle 100 in a forward or other operational direction. From step 214, the method may proceed directly to step 218 or continue to step 216.

At step 216, when the lift controller 140 determines the intent to move the vehicle 100 in a forward or other operational direction, the lift controller 140 then repositions the header 120, the merger 122, or both into lowered or other operating positions or repositions the header 120, the merger 122, or both into their respective positions prior to being raised or otherwise moved into non-operating positions. Additionally or alternatively, when the lift controller 140 determines the intent to move the vehicle 100 in a forward or other operational direction, the lift controller 140 then activates the header 120, the merger 122, or both into their respective operating conditions. From step 216, the method can return to step 202 or continue to step 218.

At step 218, a method of repositioning apparatus connected to a vehicle completes, according to one embodiment. In other embodiments, one or more of these steps or operations may be omitted, repeated, or re-ordered and still achieve the desired results.

Figure 9:
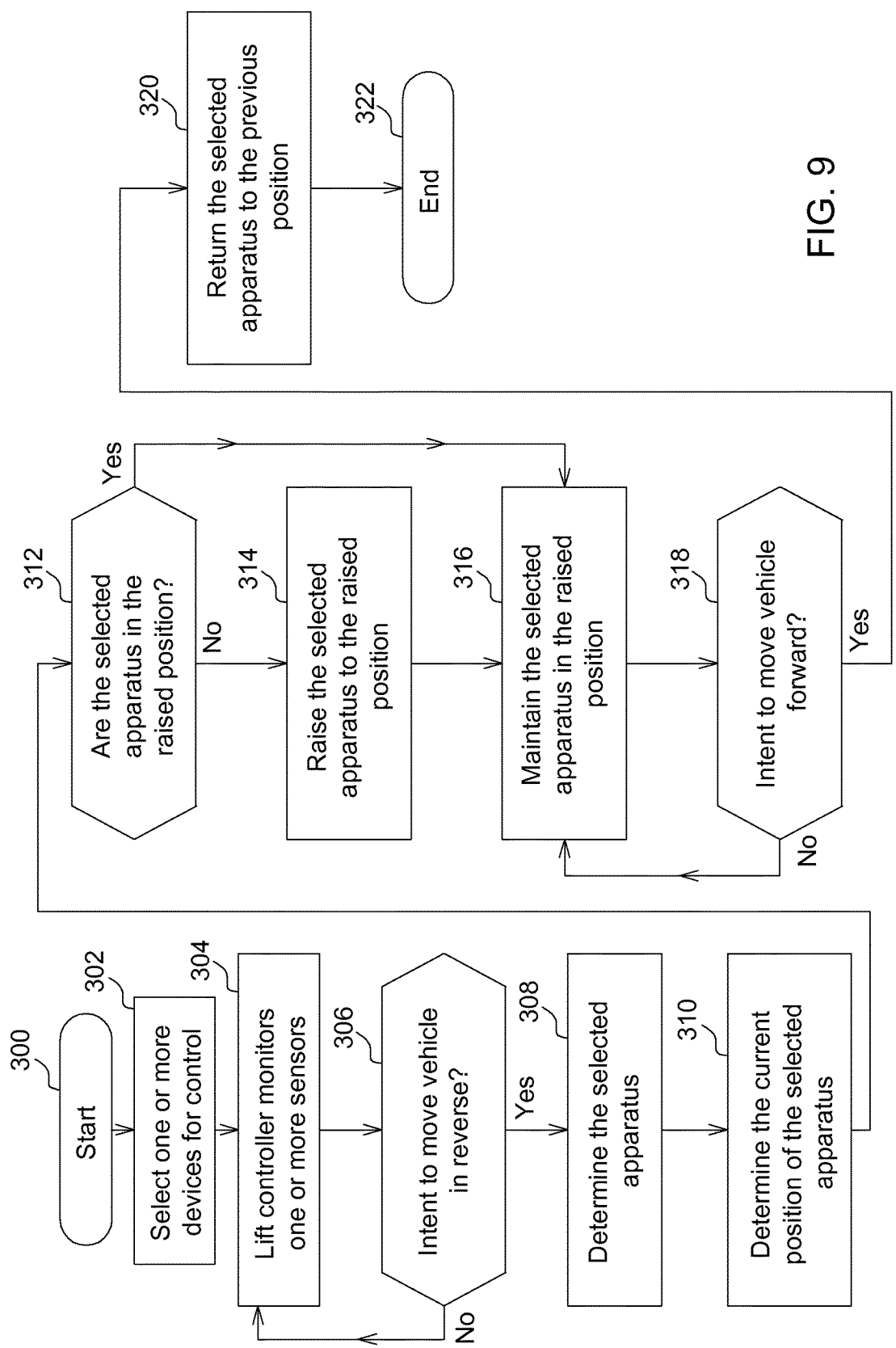
FIG. 9 is a flow diagram illustrating a method of repositioning apparatus connected to a vehicle, according to one embodiment.

FIG. 9 illustrates a flow chart of a method of repositioning apparatus connected to a vehicle, according to one embodiment, which may be implemented in the embodiment depicted in one or more of the following figures: FIG. 5, FIG. 5A, FIG. 6, and FIG. 6A. At step 300, the automated repositioning system is activated and the method starts.

At step 302, one or more devices connected to the vehicle 100 are selected to be automatically controlled by the lift controller 140. Alternatively, if none of the devices are selected to be automatically controlled by the lift controller 140, then the method would wait at step 302 until one or more devices were selected or the method would proceed directly to step 322, bypassing the other steps.

At step 304, the lift controller 140 monitors one or more sensors, devices, or both. The vehicle could be stationary or moving in any direction.

A step 306, the lift controller 140 determines an intent to move the vehicle 100 in a reverse or other non-operational direction.

At step 308, when the lift controller 140 determines the intent to move the vehicle 100 in a reverse or other non-operational direction, then the lift controller 140 determines which devices are currently selected for control.

At step 310, the lift controller 140 then determines the position, the condition, or both of the selected devices.

At step 312, the lift controller 140 determines whether to raise or reposition the selected devices based at least in part on the position of the devices. Additionally or alternatively, the lift controller 140 determines whether to deactivate the selected devices based at least in part on the operating condition of the devices.

At step 314, if the selected devices are in lowered or operating positions, then the lift controller 140 repositions the selected devices into a raised or other non-operating positions. Additionally or alternatively, if the selected devices are in an operating condition, then the lift controller 140 deactivates the selected devices into a non-operating condition.

At step 316, if the selected devices are in raised or other non-operating positions, then the lift controller 140 maintains the selected devices in the raised or non-operating positions. Additionally or alternatively, if the selected devices are in non-operating conditions, then the lift controller 140 maintains the selected devices in the non-operating conditions.

At step 318, the lift controller 140 determines the intent to move the vehicle 100 in a forward or operational direction. From step 318, the method may proceed directly to step 322 or continue to step 320.

At step 320, when the lift controller 140 determines the intent to move the vehicle 100 in a forward or operational direction, the lift controller 140 then repositions the selected devices into lowered or operating positions or repositions the selected devices into their respective positions prior to being raised or moved into non-operating positions. Additionally or alternatively, when the lift controller 140 determines the intent to move the vehicle 100 in a forward or other operational direction, then the lift controller 140 activates the header 120, the merger 122, or both into their respective operating conditions. From step 320, the method can return to step 302 or continue to step 322.

At step 322, a method of repositioning apparatus connected to a vehicle completes, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is an automated system for raising, lowering, or otherwise repositioning one or more apparatus connected to a vehicle when the vehicle commences in a direction or changes direction. Another technical effect of one or more of the example embodiments disclosed herein is an automated system which raises a harvesting header and a merger device when the intent to move the vehicle in a reverse direction is determined. Another technical effect of one or more of the example embodiments disclosed herein is automated system which returns a harvesting header and a merger device to their corresponding operating positions when the intent to move the vehicle in a forward or operational direction is determined. Another technical effect of one or more of the example embodiments disclosed herein is a reliable apparatus and method for automatically raising equipment attached to a vehicle when the vehicle is moved in a reverse direction.

The terminology used herein is for the purpose of describing particular implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. An agricultural vehicle comprising:
   a frame member;
   a harvesting header connected to the frame member of the agricultural vehicle having forward and reverse directions;
   a merger device connected to the frame member of the agricultural vehicle;
   a lift controller in communication with a direction sensor, a header sensor configured to detect a position of the harvesting header, and a merger sensor configured to detect the position of the merger device, the lift controller automatically repositioning the harvesting header and the merger device into non-operating positions when the lift controller determines an intention to move the agricultural vehicle in the reverse direction, and the header sensor and merger sensor indicate the harvesting header and the merger device are in an operation condition, the lift controller delaying the repositioning of the merger device until after the harvesting header has commenced repositioning, and the lift controller repositioning the harvesting header and the merger device into their operating positions when the lift controller determines an intention to move the agricultural vehicle in the forward direction;
   a direction input device which controls the direction of the agricultural vehicle, the direction sensor which detects the position of the direction input device, the lift controller determining the intention to move the agricultural vehicle in the reverse direction based upon the position of the direction input device communicated by the direction sensor; and
   a device selector which pre-selects one or more of the harvesting header and merger device that the lift controller automatically repositions, the device selector selectively activating and deactivating the automatic repositioning functionality of the lift controller.

2. The agricultural vehicle of claim 1, wherein the merger device is positioned under the frame member of the agricultural vehicle and between a front and a rear ground engaging apparatus.

3. The agricultural vehicle of claim 1, wherein the lift controller delays the repositioning of the merger device for a specific length of time after the harvesting header has commenced repositioning.

4. The agricultural vehicle of claim 1, wherein the lift controller delays the repositioning of the merger device until the harvesting header reaches a specific position relative to the agricultural vehicle.

5. The agricultural vehicle of claim 1, wherein the lift controller completely repositions the harvesting header relative to the agricultural vehicle before commencing the repositioning of the merger device.

6. The agricultural vehicle of claim 1, further comprising:
   a deflector connected to the agricultural vehicle, wherein the device selector pre-selects one or more of the harvesting header, merger device, and deflector that the lift controller automatically repositions.

7. The agricultural vehicle of claim 6, wherein the device selector pre-selects the harvesting header and merger device that the lift controller automatically repositions.

8. The agricultural vehicle of claim 6, wherein the device selector pre-selects the merger device and deflector that the lift controller automatically repositions.

9. The agricultural vehicle of claim 6, wherein the device selector pre-selects the harvesting header and deflector that the lift controller automatically repositions.

10. The agricultural vehicle of claim 6, wherein the device selector pre-selects the harvesting header, merger device, and deflector that the lift controller automatically repositions.

11. The agricultural vehicle of claim 1, wherein the lift controller communicates with a power-take-off sensor to detect one of whether a power-take-off shaft is rotating and a rotational speed of a power-take-off shaft to indicate whether the harvesting header and merger device are in the operation condition.

12. The agricultural vehicle of claim 1, wherein the lift controller further communicates with a transmission sensor comprising one or more speed sensors to measure speeds of transmission shafts of the agricultural vehicle and determine the intention to move the agricultural vehicle in the reverse direction.

13. A method of repositioning a harvesting device connected to an agricultural vehicle comprising:
   pre-selecting a harvesting header and a merger device for automatic repositioning;
   determining whether there is an intent to move the agricultural vehicle in a reverse direction via detecting a position of a direction input device by a sensor;
   determining the positions of the harvesting header and merger device, and if the harvesting header and merger device are in their respective operating positions, then automatically repositioning of the harvesting header and merger device to non-operating positions based at least in part upon the intent to move the agricultural vehicle in the reverse direction, and delaying the repositioning of the merger device until after the harvesting header commences repositioning;
   determining whether there is an intent to move the agricultural vehicle in the forward direction via detecting the position of the direction input device by the sensor; and
   automatically repositioning the harvesting header and merger device into their respective operating positions.

14. The method of claim 13, wherein the step of automatically repositioning includes delaying the repositioning of the merger device for a specific length of time after the harvesting header has commenced repositioning.

15. The method of claim 13, wherein the step of automatically repositioning includes delaying the repositioning of the merger device until the harvesting header reaches a specific position relative to the agricultural vehicle.

16. The method of claim 13, wherein the step of automatically repositioning includes completely repositioning the harvesting header relative to the agricultural vehicle before commencing the repositioning of the merger device.

17. The method of claim 13, where the step of pre-selecting further comprises pre-selecting a deflector for automatic repositioning.

18. The method of claim 13, wherein the step of determining the positions of the harvesting header and merger devices further comprises detecting one of whether a power-take-off shaft is rotating and a rotational speed of a power-take-off shaft to indicate whether the harvesting header and merger device are in the operation condition.

19. The method of claim 13, wherein the step of determining whether there is an intent to move the agricultural vehicle further comprises measuring speeds of transmission shafts of the agricultural vehicle.

\* \* \* \* \*